US011334565B1

(12) United States Patent
Cheng et al.

(10) Patent No.: US 11,334,565 B1
(45) Date of Patent: May 17, 2022

(54) SYSTEM TO CONVERT NATURAL-LANGUAGE FINANCIAL QUESTIONS INTO DATABASE QUERIES

(71) Applicant: INTUIT INC., Mountain View, CA (US)

(72) Inventors: Lulu Cheng, Mountain View, CA (US); Meng Chen, Mountain View, CA (US); Jing Zhang, Mountain View, CA (US); Wenting Cai, Mountain View, CA (US); Crystal Meng, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 250 days.

(21) Appl. No.: 15/337,324

(22) Filed: Oct. 28, 2016

(51) Int. Cl.
  *G06F 16/2452* (2019.01)
  *G06F 16/242* (2019.01)
  *G06F 16/2457* (2019.01)

(52) U.S. Cl.
  CPC ...... *G06F 16/24522* (2019.01); *G06F 16/243* (2019.01); *G06F 16/2457* (2019.01)

(58) Field of Classification Search
  CPC ........... G06F 17/3043; G06F 17/30522; G06F 17/30401
  See application file for complete search history.

(56) References Cited

U.S. PATENT DOCUMENTS

| 9,501,585 | B1* | 11/2016 | Gautam | G06F 17/30572 |
|---|---|---|---|---|
| 2002/0188586 | A1* | 12/2002 | Veale | G06F 16/367 |
| 2005/0172007 | A1* | 8/2005 | Avrahami | G06F 17/30572 709/219 |
| 2007/0233638 | A1* | 10/2007 | Carroll | G06F 17/30587 |
| 2010/0138402 | A1* | 6/2010 | Burroughs | G06F 16/3344 707/706 |
| 2012/0078902 | A1* | 3/2012 | Duboue | G06F 16/334 707/736 |
| 2014/0379473 | A1* | 12/2014 | Zhou | G06Q 30/0256 705/14.54 |
| 2017/0337209 | A1* | 11/2017 | Schaer | G06F 17/30867 |
| 2018/0095962 | A1* | 4/2018 | Anderson | G06F 16/24522 |

* cited by examiner

*Primary Examiner* — William B Partridge
*Assistant Examiner* — Aryan D Toughiry
(74) *Attorney, Agent, or Firm* — Patterson & Sheridan, LLP (57) ABSTRACT

Systems of the present disclosure generate database queries for financial information requested in a natural-language form. A natural-language processing (NLP) financial aggregator receives a request for financial information and extracts NLP features of the request, including keywords. The NLP financial aggregator determines a type of the request based on the features and creates a query in a database-query language for the financial information based on the type and on the features. The NLP financial aggregator submits the query to a database where the financial information is stored. The software then receives the financial information from the database and sends the information to the user.

9 Claims, 7 Drawing Sheets

FIG. 7

SYSTEM TO CONVERT NATURAL-LANGUAGE FINANCIAL QUESTIONS INTO DATABASE QUERIES

BACKGROUND

Field

Embodiments presented herein generally relate to Natural Language Processing (NLP) systems. More specifically, techniques are disclosed for translating natural-language financial questions into database queries.

Related Art

Many software applications help people manage financial information. For example, some help consumers manage their own personal finances, while others help businesses manage payroll, inventory, sales, and other business-related financial affairs. In some cases, applications are executed locally on client devices. In other cases, the applications are executed remotely on servers and provided to customers as a service.

Often, these software applications have proprietary interfaces tailored for the types of financial information they process and the types of tasks they typically perform. As a result, users generally have to familiarize themselves with these proprietary interfaces in order to enjoy the full functionality these applications offer. Such interfaces may also be difficult to use on mobile devices that lack full-size keyboards and have small screens.

Nevertheless, financial management software can keep large volumes of information organized, accurate, and accessible. Financial management software can streamline day-to-day operations and provide periodic reports to inform corporate decision-making.

DETAILED DESCRIPTION

Embodiments presented herein provide techniques for translating natural-language financial questions into database queries. In one embodiment, a natural language processing (NLP) financial aggregator receives a request for financial information from a user, determines natural language processing (NLP) features of the request, determines a type of the request based on the features, and creates a query in a database-query language for the financial information based on the type and the features, and submits the query to a database where the financial information is stored. The software then receives the financial information from the database and sends the information to the user.

For example, in one embodiment, a user is a customer of an online financial software service for personal financial management. Assume a user would like to know how much was spent last month at restaurants. The financial software service stores a record of each purchase the user makes in a database, including purchases made at restaurants. However, the user is unsure of how to navigate through the interface to find this financial information. The user is also in a hurry and wants to avoid spending the time it would take to identify and add up all the relevant entries manually. Instead, the user enters a natural-language text request for the information in an interface for an NLP financial aggregator. For example, the request may be "How much did I spend at restaurants last month?" or a similar question.

The NLP financial aggregator parses the request using an NLP parser. The NLP parser extracts features from the request. Some of these features include keywords and phrases, such as "restaurants," "how much," and "last month." Based on these keywords, the NLP financial aggregator determines this request is of a type that calls for a sum ("how much") of a certain category of purchases ("restaurants") made over a certain time period ("last month").

The NLP financial aggregator is associated with the financial software service and can access the database that stores the desired information by using the user's logon credentials. The NLP financial aggregator generates a query (e.g., in Structured Query Language (SQL)) for the requested financial information.

The NLP financial aggregator submits the query to the database. In response, the database returns the requested financial information. In this example, the financial information is a dollar amount. The NLP financial aggregator receives the financial information and formulates a natural-language response that includes the dollar amount and at least one of the keywords or phrases that the NLP parser extracted from the request. The NLP financial aggregator sends the response to the user. In this example, the response may be "You spent $317.15 at restaurants last month."

Figure 1:
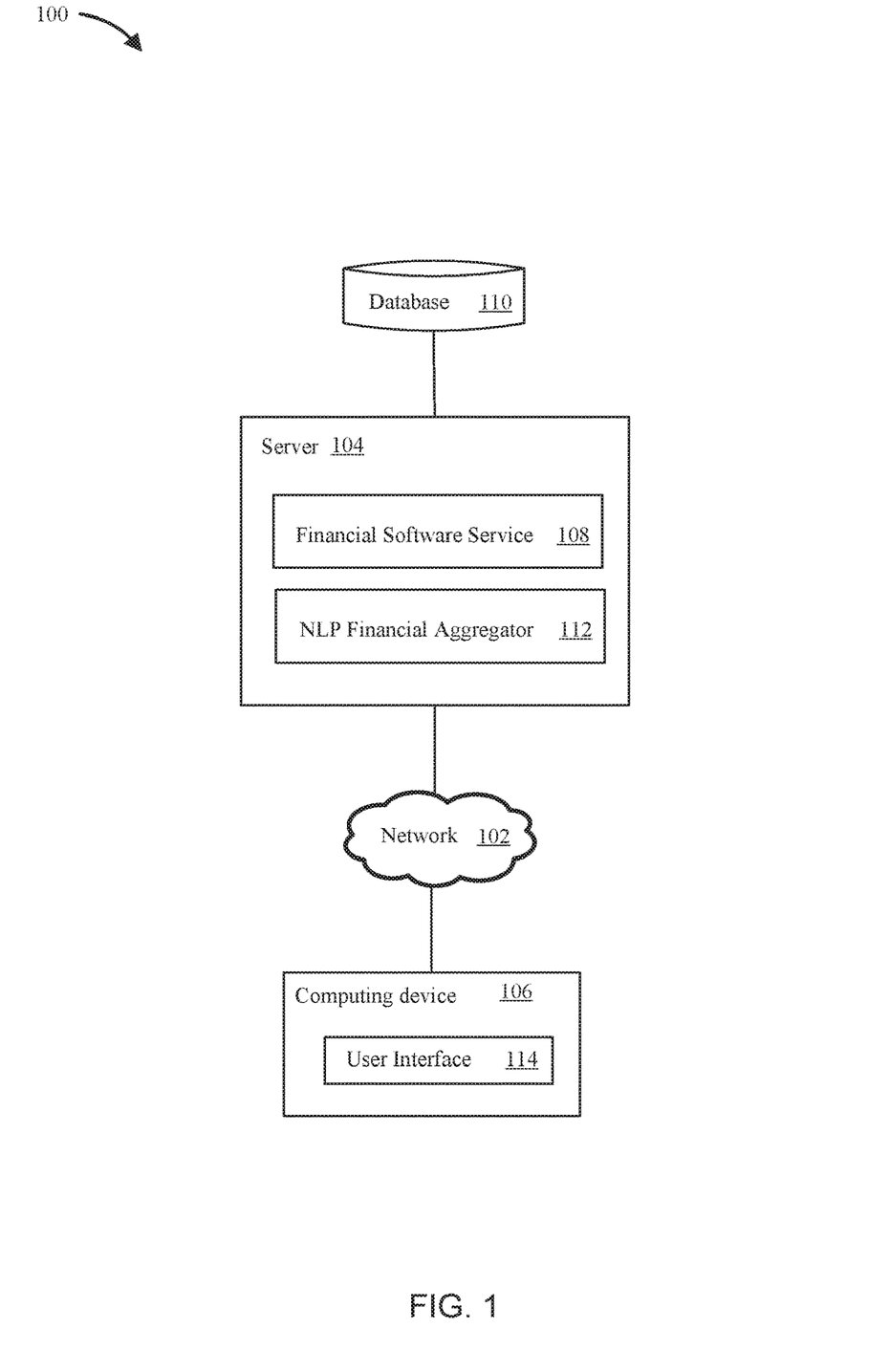
FIG. 1 illustrates a computing network environment wherein technology of the present disclosure can operate, according to one embodiment.

FIG. 1 illustrates a computing network environment 100 wherein technology of the present disclosure can operate, according to one embodiment. A computing device 106 and a server 104 are connected to a network 102. The server 104 includes a financial software service 108 and an NLP financial aggregator 112. A database 110 stores data for the financial software service 108. The financial software service 108 may provide budgeting, banking, investing, planning, or tax services to a user.

Through a user interface 114, a user submits a request for financial information to the NLP financial aggregator 112. The request is in a natural language, such as English. The NLP financial aggregator 112 extracts keywords from the request and determines a request type based on the keywords. The NLP financial aggregator 112 translates the request into a query in a database query language based on the request type and the keywords.

The NLP financial aggregator 112 submits the query to the database 110. The database 110 responds by sending the financial information to the NLP financial aggregator 112. The NLP financial aggregator 112 formulates a natural-language response for the request. The natural-language response includes the financial information. The natural-language response may also include at least one of the keywords. Also, if a keyword is a verb conjugated in first person for the user, the response may include a version of the verb conjugated in second person. For example, if the request includes the word "spend" (e.g., "how much did I spend on gasoline last month?"), the response may use the word "spent" (e.g., "you spent $50 on gasoline last month). The NLP financial aggregator 112 may also adjust the verb tense used for the keyword.

The NLP financial aggregator 112 sends the natural-language response, including the requested financial information, to the user via the network 102. The user may view the response with the user interface 114.

Figure 2:
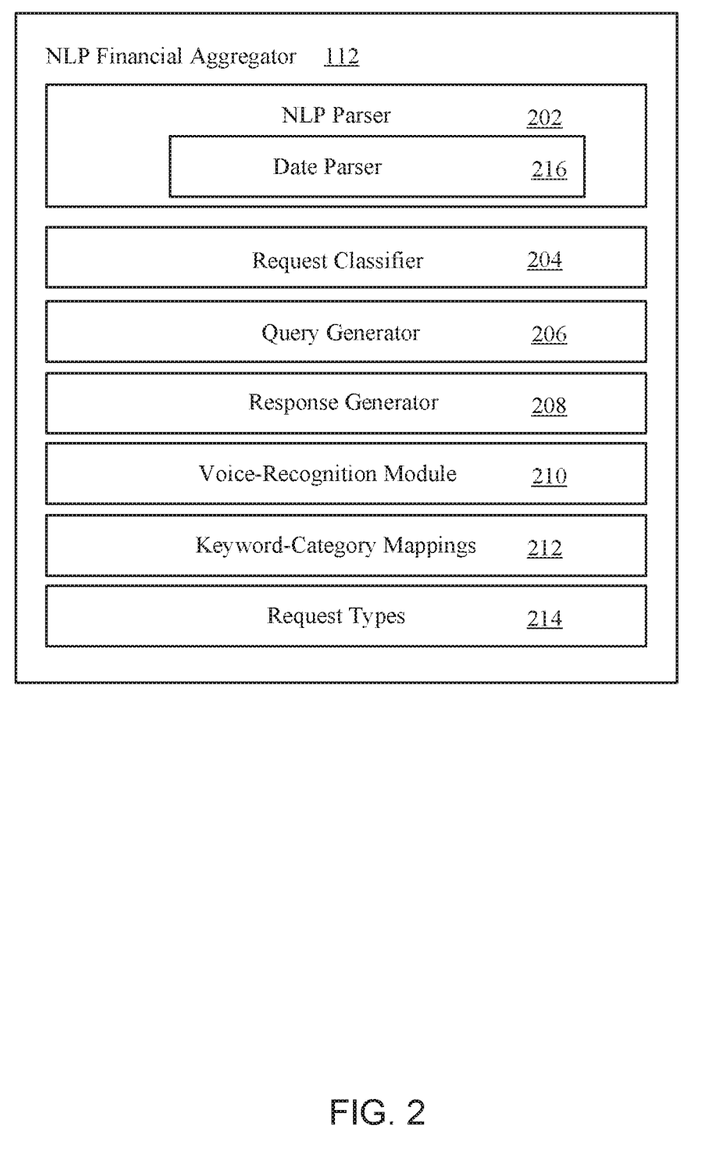
FIG. 2 illustrates a detailed view of an NLP financial aggregator, according to one embodiment.

FIG. 2 illustrates a detailed view of the NLP financial aggregator 112, according to one embodiment. The NLP financial aggregator 112 serves as a tool that enables the user to get relatively quick responses to natural-language requests for financial information that is stored in the database 110 for the financial software service 108. The user sends a natural-language request for financial information to the NLP financial aggregator 112. In one example, the user types the request using a device such as a keyboard or a virtual keyboard on a touch screen. In another example, the user speaks the request into a microphone and the voice-recognition module 210 transcribes the request and sends the request to the NLP parser 202 in a text format.

The NLP parser 202 extracts a set of NLP features, such as keywords, from the request. The NLP features characterize the request. In some examples, the request includes information that narrows the request to a specific time period, such as a certain day or a date range with a starting date and an ending date. In these examples, the date parser 216 identifies the time period referenced in the request. In addition, the NLP parser 202 may also apply the keyword-category mappings 212 to determine whether the request includes information that narrows the request to certain purchase-type categories, merchant categories, banking-institution categories, card-type categories, or account-type categories.

The NLP parser 202 provides the features to the request classifier 204. The request classifier 204 determines a request type of the request types 214 for the request based on the features. In one example, the request may be "How much did I pay on credit card debts last year?" In this example, the request classifier 204 may determine the request fits a request type such as "amount spent."

Based on the request type and based on the features, the query generator 206 creates a query in a database query language for the financial information. If the date parser 216 identified a time period to which the request applies, the query includes elements that specify the time period. Also, if the NLP parser 202 determined that the request is specific to any categories based on the keyword-category mappings 212, the applicable categories are also specified in the query.

The query generator 206 submits the query to the database 110. The NLP financial aggregator 112 has access to the database 110 via the user's credentials. The database 110 send the financial information to the NLP financial aggregator 112 as a query response.

The response generator 208 creates a natural-language response to the request based on the features. The natural-language response includes the financial information. In addition, the natural-language response can include the time period and at least one of the keywords (e.g., a keyword that mapped to a category in the keyword-category mappings 212). In one example, the request is "How much income did I receive in my Acme Bank checking account in June 2016?" In this example, the natural-language response may be "You received $3,300 of in your Acme checking account in June 2016." In this manner, the response includes the keywords Acme, Bank, checking, and account (as well as a modified version of the verb keyword "receive"). The response also indicates the time period "June 2016" and the financial information ("$3,300"). The NLP financial aggregator 112 sends the response to the user via the network 102. The user can view the response in the user interface 114.

In an additional example, the user submits the request "Can I afford a $700 smartphone this month?" In this example, the NLP parser 202 extracts the keyword "afford" and the term "$700" as features of the request. Based on the keyword "afford" the term "$700" and other features of the request, the request classifier 204 determines that a request type of "budget comparison" applies to the request. The date parser 216 also determines that the request applies to the current month.

Based on the request type and the keyword features, the query generator 206 generates a query for the database 110 that calls for $700 to be compared to an amount of disposable income in the user's budget for the current month. If the amount of disposable income is not stored explicitly in the database, the form of the query may call for the amount of disposable income to be calculated. For example, the query may be call for a total income amount and a total expenses amount to be calculated for the current month. The query may call for the difference of the total income amount and the total expenses amount to be compared to $700 in a Boolean fashion.

The NLP financial aggregator 112 submits the query to the database 110. In response, the database 110 sends a Boolean indicator. Based on the Boolean indicator, the features, and the request type, the response generator 208 generates the natural-language response "No, you cannot afford to buy a $700 smartphone this month." The natural language response includes the keyword "afford" and the financial information requested. In this case, the financial information is conveyed by the words of the response (e.g., "No") rather than a specific amount. The NLP financial aggregator 112 sends the response to the user via the network 102. The user views the response in the user interface 114.

In another additional example, the user has a checking account with Acme bank. The user submits the request "How much did I spend from my Acme checking account last week?" In this example, the NLP parser 202 extracts the keywords "spend," "checking," "account," "Acme," "last," and "week," Based on these keywords, the request classifier 204 determines that a request type "amount spent" applies to the request. The date parser 216 also determines that the request applies to the week previous to the current week. The NLP parser 202 also compares the keywords to the keyword-category mappings 212 to determine that the request is specific to transactions from the Acme checking account.

Based on the request type and the keyword features, the query generator 206 generates a query for the database 110. The query calls for a sum of debit transactions made on the user's Acme checking account during the previous week. The NLP financial aggregator 112 submits the query to the database 110. In response, the database 110 sends the requested financial information (in this case, an aggregate amount) to the NLP financial aggregator 112. Based on the keyword features and the request type, the response generator 208 generates the response "You spent $127 from your Acme checking account last month." Again, the response includes the requested financial information ("$127") and several keywords found in the request. The NLP financial aggregator 112 sends the response to the user via the network 102. The user views the response in the user interface 114.

Figure 3:
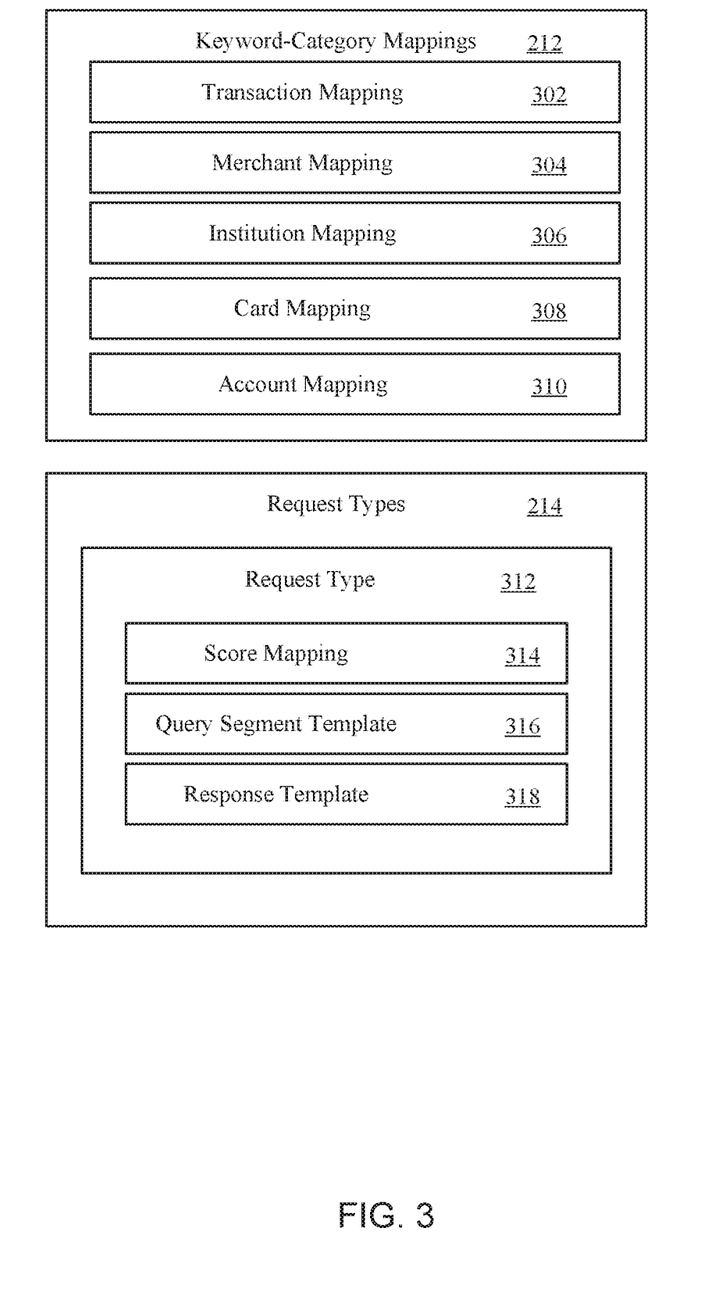
FIG. 3 illustrates detailed views of keyword-category mappings and request types, according to an embodiment.

FIG. 3 illustrates detailed views of the keyword-category mappings 212 and the request types 214, according to an embodiment. As shown, the keyword-category mappings 212 include a transaction mapping 302, a merchant mapping 304, an institution mapping 306, a card mapping 308, and an account mapping 310.

The transaction mapping 302 maps keywords to transaction categories. For example, the word "clothing" may map to a "Clothes" transaction category. In another example, the word "food" may map to a "food" transaction category and also to a "grocery" transaction category. In another example, the word "pet" may map to a "Pet Food & Supplies" transaction category and also to a "Veterinary" transaction category. If a natural-language request contains a keyword that maps to a transaction category in the transaction mapping 302, an NLP parser associates the request with the transaction category. A query generator specifies the transaction category in a database query for the financial information asked for by the request.

The merchant mapping 304 maps keywords to merchant categories. For example, the word "XYZ" may map to a category for "XYZ Widgets, Inc." If a natural-language request contains a keyword that maps to a merchant category in the merchant mapping 304, an NLP parser associates the request with the merchant category. A query generator specifies the merchant category in a database query for the financial information asked for by the request.

The institution mapping 306 maps keywords to institution (e.g., bank or credit union) categories. For example, the word "ABC" may map to a category "ABC Bank." If a natural-language request contains a keyword that maps to an institution category in the institution mapping 306, an NLP parser associates the request with the institution category. A query generator specifies the institution category in a database query for the financial information asked for by the request. An NLP financial aggregator may identify institutions with which a user banks has by communicating with a financial software service to which the user subscribes. The NLP financial aggregator can include at least one entry in the institution mapping 306 for each of those institutions. For example, keywords included in a name or description of an institution provided by the financial service can map to the category corresponding to the institution in the institution mapping 306.

The card mapping 308 maps keywords to card (e.g., credit card or debit card) categories. For example, the word "golden" may map to a category "golden credit card." If a natural-language request contains a keyword that maps to a card category in the card mapping 308, an NLP parser associates the request with the card category. A query generator specifies the card category in a database query for the financial information asked for by the request. An NLP financial aggregator may identify cards that a user has by communicating with a financial software service to which the user subscribes. The NLP financial aggregator can include at least one entry in the card mapping 308 for each card. For example, keywords included in a name or description of a card provided by the financial service can map to the category corresponding to the card in the card mapping 308.

The account mapping 310 maps keywords to account categories. For example, the word "debit" may map to a category "debit account 100" and to a category "debit account 200." If a natural-language request contains a keyword that maps to an account category in the account mapping 310, an NLP parser associates the request with the account category. A query generator specifies the account category in a database query for the financial information asked for by the request.

The request types 214 may include an example request type 312 and other request types. As shown, the request type 312 is associated with a score mapping 314, a query segment template 316, and a response template 318.

The score mapping 314 maps keywords to corresponding numerical amounts. In one example, the sum of the numerical amounts in the score mapping can be predefined (e.g., so that each individual numerical amount is less than or equal to the predefined sum). Like request type 312, each of the request types 214 is associated with a respective score mapping, query segment template, and response template.

To determine which of the request types 214 applies to a natural-language request for financial information, an NLP parser first identifies keywords included in the request. A request classifier then determines a score for each of the request types 214 using each respective score mapping. In one example, the request is "How much did I spend last month?" In this example, suppose score mapping 314 maps the word "how" to 0.2, the word "much" to 0.2, and the word "spend" to 0.4. Since the request contains "how," "much," and "spend," the score for request type 312 is 0.2+0.2+0.4, or 0.8. The request classifier similarly calculates scores for the other request types in request types 214 and determines that request type 312 has the highest score. Since request type 312 has the highest score out of all the request types 214, the request classifier designates request type 312 as the request type for the request.

A query generator then appends the query segment template 316 to a database query. For example, if the database query is in SQL, the database query may initially be the word "SELECT" and the query segment template 316 may be "SUM($c) FROM $t" or something similar. In this example, $c is a variable referring to a name of a column of a table in a database and $t is a variable referring to the table in the database. After the query generator appends the query segment template 316 to the query (including a whitespace character in between), the query becomes "SELECT SUM ($c) FROM $t" in this example. If any of the keywords in the request map to categories in the keyword-category mappings 212, the query generator also appends the word "WHERE" to the query followed by indicators of the categories.

Once the query is complete, the query is submitted to the database. The database responds by sending the requested financial information. A response generator inserts the financial information into the response template 318 to create a natural-language response to the request. For example, suppose the response template 318 is "You spent $a dollars $p" (where $a is a variable referring to the financial information and $p is a variable referring to a time period determined by a date parser). Also suppose that the financial information is "$256.75." In this example, the natural-language response would be "You spent $256.75 last month." The response is sent to the user who submitted the request.

Figure 4:
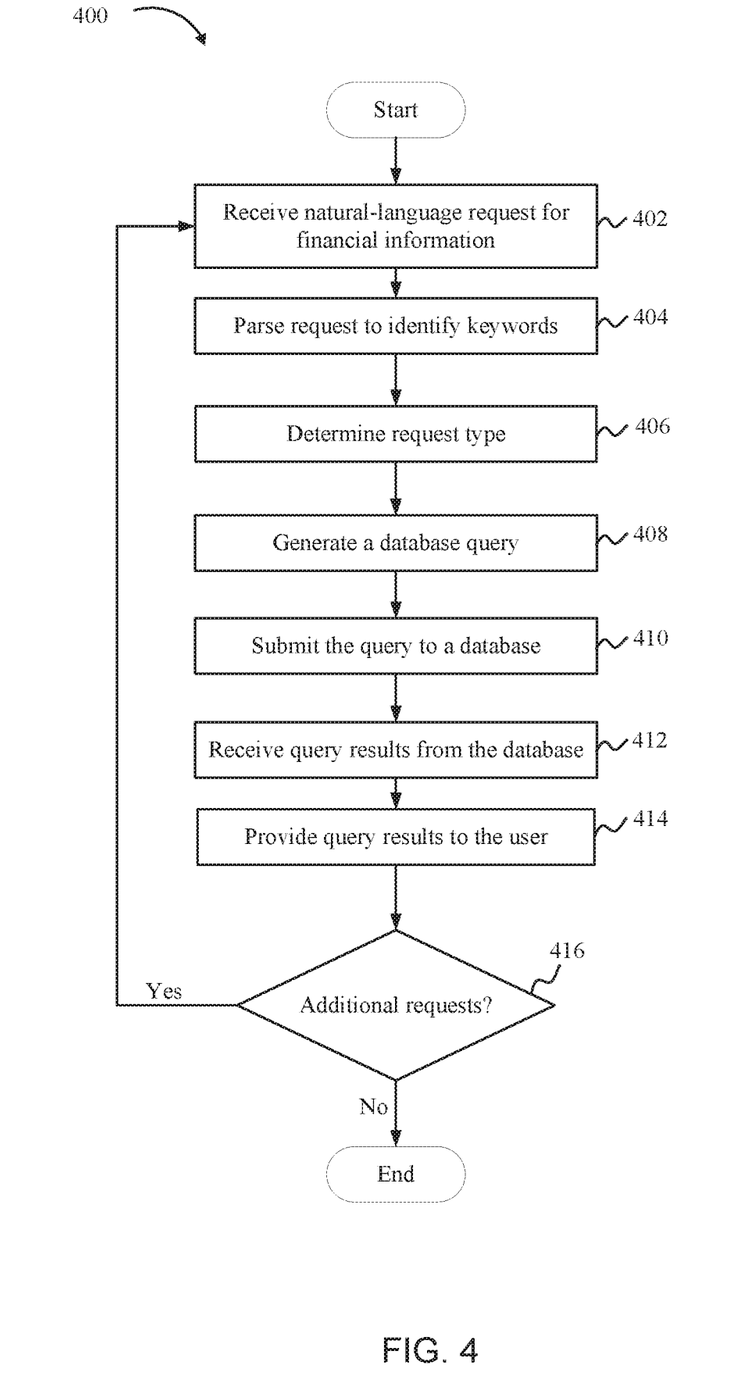
FIG. 4 illustrates a method for retrieving financial information from a database in response to natural-language requests, according to one embodiment.

FIG. 4 illustrates a method for retrieving financial information from a database in response to natural-language requests, according to one embodiment. At step 402, an NLP financial aggregator receives a natural language request for financial information from a user who is subscribed to a financial software service. The request may be received in a text format or an audio format. If the request is received in an audio format, a voice-recognition module transcribes the request into a text format.

At step 404, an NLP parser extracts features from the request, including keywords. In addition, a date parser may also identify a time period specified in the request. At step 406, a request classifier determines a request type of the request based on the features. In one embodiment, the request classifier determines a score for each of a set of request types. The request classifier may determine the score for a given request type by comparing the keywords to a score mapping corresponding to the request type. The score mapping maps words to numeric amounts. For each of the keywords that matches an entry in the score mapping, the request classifier adds the numeric amount to a score for the request type. Once the scores for the request types are calculated, the request classifier designates the request type with the best (e.g., highest) score as the type of the request.

At step 408, a query generator generates a database query for the requested financial information. In one embodiment, the query generator commences with a default initial stub of a database query, such as the word "SELECT" if the query is in SQL. Next, the query generator appends a query segment template associated with the request type. The query generator may also append, the query generator also append additional text, syntax, or punctuation to apply filtering criteria to the query. For example, the query generator may append the word "WHERE" to the query and append category indicators to the query. The query generator may also append an indicator of a time period to the query to specify that the financial information requested is associated with the time period.

At step 410, the NLP financial aggregator submits the query to a database associated with the financial software service. The NLP financial aggregator may access the database using the user's logon credentials for the financial service. At step 412, the NLP financial aggregator receives query results (e.g., the financial information) from the database in response to the query.

At step 414, the NLP financial aggregator provides the query results to the user. In one embodiment, a response generator identifies a response template associated with the request type. The response generator adds the query results to the response template to create a natural-language response for the request. NLP financial aggregator sends the natural-language response to the user.

At step 416, the NLP financial aggregator determines whether the user has submitted any additional requests for financial information. If the user has, the NLP financial aggregator repeats steps 402-414 for the additional requests. In one embodiment, the requests submitted by the user are part of a session. The NLP financial aggregator can, in some examples, use keywords from previous requests in a session to help determine a request type or categories for a subsequent request in the same session. Once the user is done submitting requests, the method 400 terminates.

Figure 5:
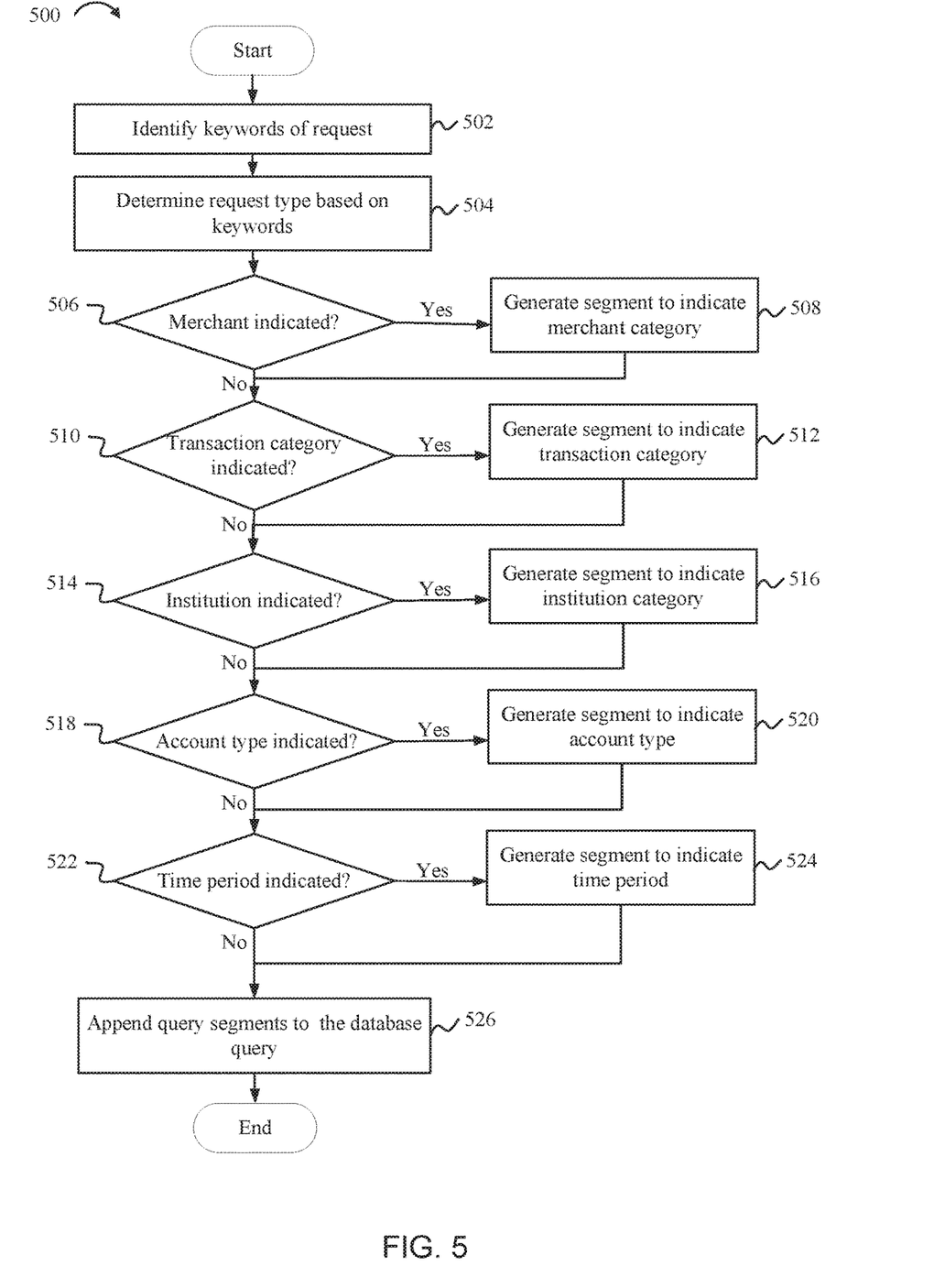
FIG. 5 illustrates a method for generating a database query based on a natural-language textual request for financial information, according to one embodiment.

FIG. 5 illustrates a method for generating a database query based on a natural-language textual request for financial information, according to one embodiment. At step 502, an NLP parser identifies keywords of the request. A keyword may appear explicitly in the request or in a conjugated, plural, or other form. At step 504, a request classifier determines a type of the request based on the keywords. In one embodiment, the request classifier determines a score for each of a set of request types. The request classifier may determine the score for a given request type by comparing the keywords to a score mapping corresponding to the request type. The score mapping maps words to numeric amounts. For each of the keywords that matches an entry in the score mapping, the request classifier adds the numeric amount to a score for the request type. Once the scores for the request types are calculated, the request classifier designates the request type with the best (e.g., highest) score as the type of the request.

At step 506, an NLP parser determines whether the request indicates any merchant categories to be applied as filters to query results. In one embodiment, the NLP parser compares the keywords to a merchant mapping. If none of the keywords map to merchant categories, the NLP parser proceeds to step 510. If the request contains a keyword that maps to a merchant category in the merchant mapping, the NLP parser associates the request with the merchant category. At step 508, a query generator creates a query segment to indicate the merchant category. Since the keywords of the request may map to multiple merchant categories in the merchant mapping, the query generator may create a respective query segment for each applicable merchant category.

At step 510, the NLP parser determines whether the request indicates any transaction categories to be applied as filters to query results. In one embodiment, the NLP parser compares the keywords to a transaction mapping. If none of the keywords map to transaction categories, the NLP parser proceeds to step 514. If the request contains a keyword that maps to a transaction category in the transaction mapping, the NLP parser associates the request with the transaction category. At step 512, the query generator creates a query segment to indicate the transaction category. Since the keywords of the request may map to multiple transaction categories in the transaction mapping, the query generator may create a respective query segment for each applicable transaction category.

At step 514, the NLP parser determines whether the request indicates any institution categories to be applied as filters to query results. In one embodiment, the NLP parser compares the keywords to an institution mapping. If none of the keywords map to institution categories, the NLP parser proceeds to step 518. If the request contains a keyword that maps to an institution category in the institution mapping, the NLP parser associates the request with the institution category. At step 516, the query generator creates a query segment to indicate the institution category. Since the keywords of the request may map to multiple institution categories in the institution mapping, the query generator may create a respective query segment for each applicable institution category.

At step 518, the NLP parser determines whether the request indicates any account categories to be applied as filters to query results. In one embodiment, the NLP parser compares the keywords to an account mapping. If none of the keywords map to account categories, the NLP parser proceeds to step 522. If the request contains a keyword that maps to an account category in the account mapping, the NLP parser associates the request with the account category. At step 520, the query generator creates a query segment to indicate the account category. Since the keywords of the request may map to multiple account categories in the account mapping, the query generator may create a respective query segment for each applicable account category.

At step 522, the NLP parser determines whether the request indicates a time period to be applied as a filter to query results. In one embodiment, the NLP parser includes a date parser. The date parser compares the request to a predefined set of words that can be used to articulate time periods in natural language. In one example, the predefined set of words may include {on, in, between, from, and, to, since}. The date parser splits the request into substrings based on the predefined set of words. For example, the request could be "How much did I spend out of my Bank ABC checking account from last year to this year?" In this example, the date parser splits the request into the substrings "How much did I spend out of my Bank ABC checking account," "last year," and "this year" by treating the words "from" and "to" from the predefined word set as delimiters.

After splitting the request into substrings, the date parser analyzes each substring to identify a date or some other indication of a time period. For example, the date parser may map words or phrases to dates, months, or years. For example, the date parser may include logic that maps "this year" to the current year (e.g., as specified in an environment variable), "last year" to the previous year, "this month" to the current month, "last month" to the previous month, "today" to the current day, and "yesterday" to the previous day. In addition, the date parser may also include robust logic to parse explicit dates, years, or months included in the request. For example, the date parser may recognize a date in a substring by finding a match for a regular expression that specifies a date format. If two dates are specified, the date parser may determine that the time period applicable to the request is a date range that includes the two dates and any dates in between.

If no indications of time periods are found in the substrings, the NLP parser proceeds to step 526. Otherwise, at step 524, the query generator creates a query segment to indicate the time period. Since the request may indicate multiple time periods, the query generator may create a respective query segment for each applicable time period.

At step 526, the query generator appends the query segments to a database query. The database query may begin with an initial stub, such as "SELECT." The query generator may also append a first query segment derived from a template associated with the request type before appending other query segments.

Figure 6:
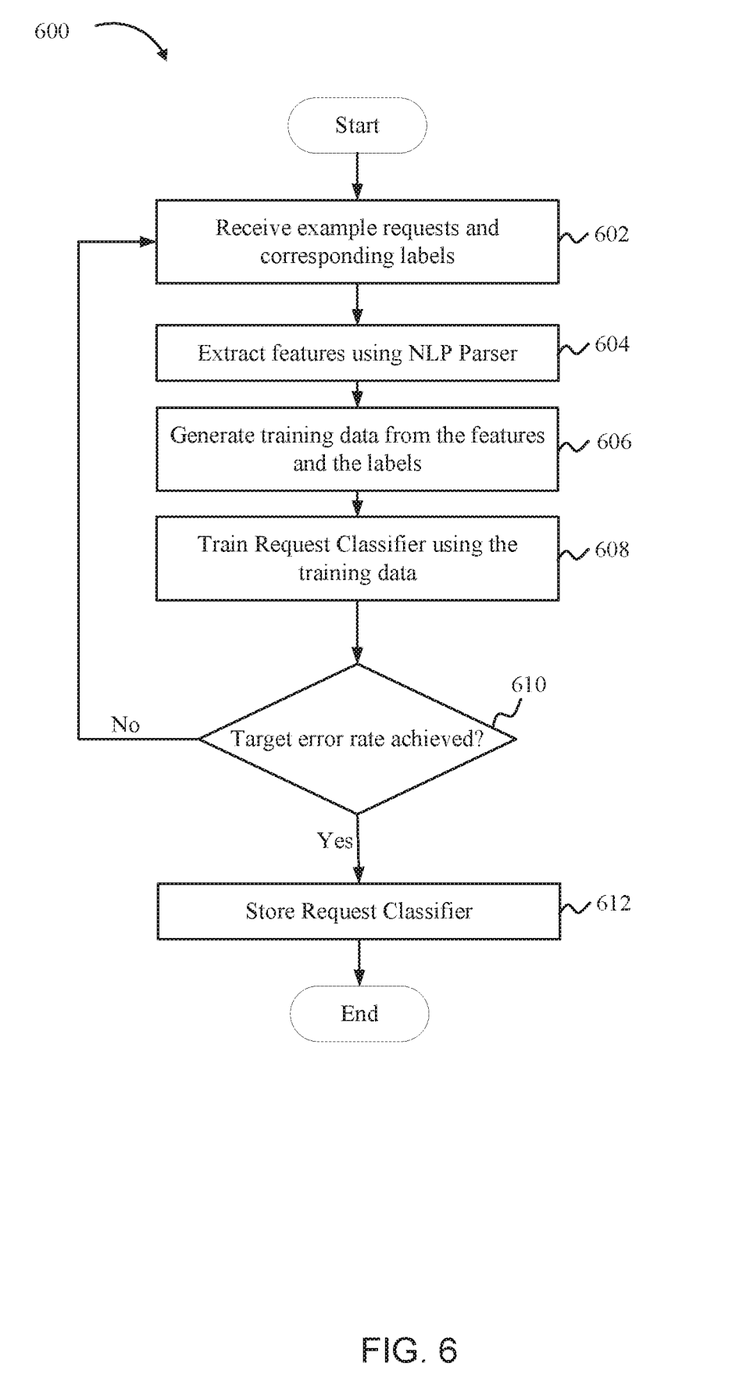
FIG. 6 illustrates a method for training a request classifier, according to one embodiment.

FIG. 6 illustrates a method 600 for training a request classifier, according to one embodiment. At step 602, example requests and corresponding labels are received. A label indicates the request type that the request classifier will be trained to assign to the corresponding request. At step 604, an NLP parser extracts features (e.g., keywords) from each request. At step 606, training data is generated using the features and the label. For example, the training data may comprise a plurality of training instances. Each training instance comprises the features of a corresponding example request and the label of the example request.

At step 606, the request classifier is trained using the training data. The request classifier is a machine-learning model that receives the features of a request as input and outputs a predicted request type. Through training, the request classifier adjusts itself to predict request types for the training instances more accurately. There are many different types of inductive and transductive machine-learning models that can be used as the request classifier. The details of how the training process adjusts the request classifier depend on the model type used.

Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Q-learning models.

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAID) methods. These methods may use one or more different metrics to determine the order in which attribute values are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data.

At step 610, the request classifier determines whether a target error rate has been achieved on the training data (or on set of test data separated from the training data). The target error rate indicates how frequently the request classifier correctly predicts the request types for each request. If the request classifier has not achieved the target error rate, steps 602-608 are repeated so that the request classifier can be trained with a larger amount of training data. On the other hand, if the request classifier has achieved the target error rate, the request classifier is stored at step 612 for later use by an NLP financial aggregator.

Figure 7:
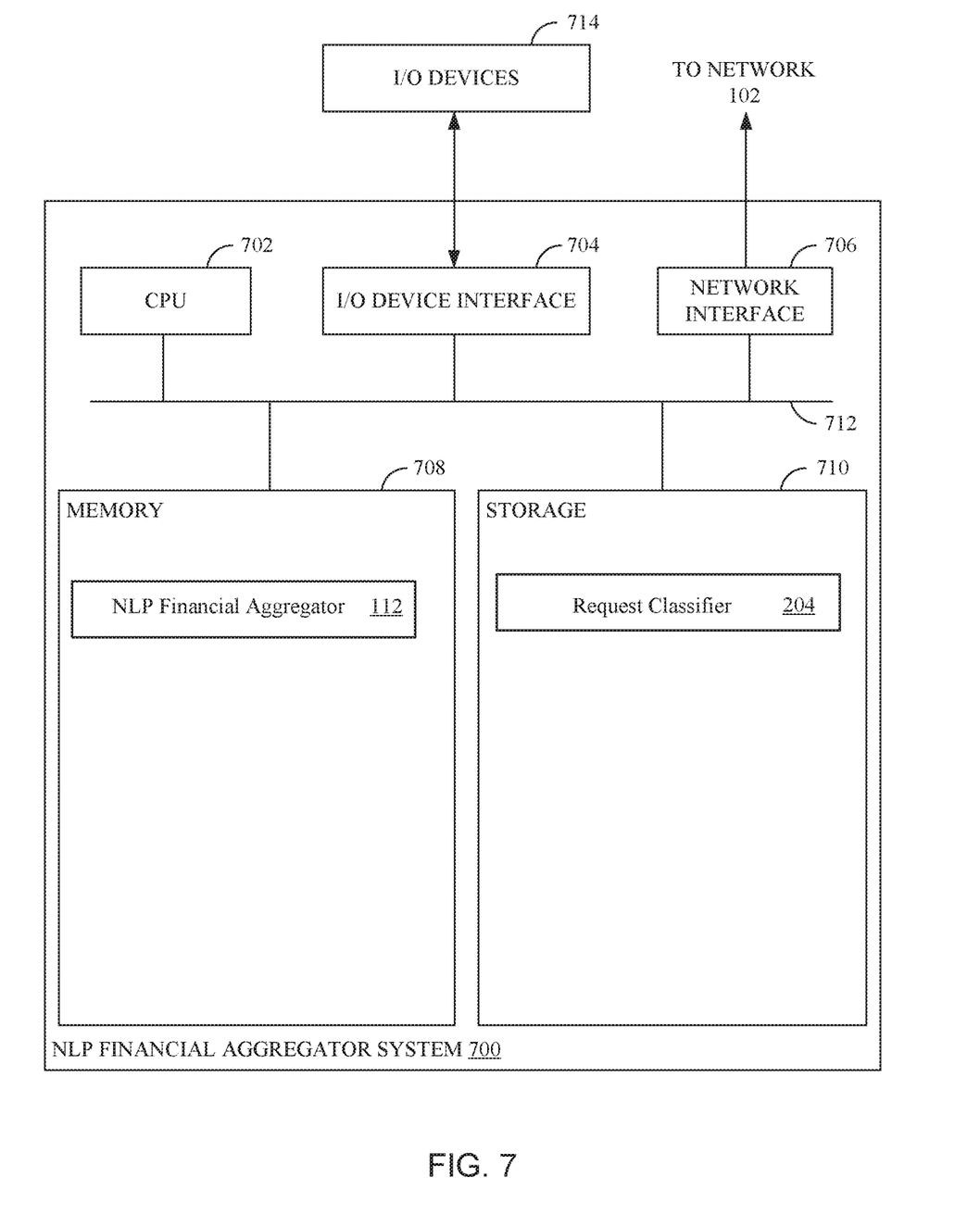
FIG. 7 illustrates an NLP financial aggregator system that converts a request for financial information into a database query, according to an embodiment.

FIG. 7 illustrates an NLP financial aggregator system 700 that converts a request for financial information into a database query, according to an embodiment. As shown, the NLP financial aggregator system 700 includes, without limitation, a central processing unit (CPU) 702, at least one I/O device interface 704 which may allow for the connection of various I/O devices 714 (e.g., keyboards, displays, mouse devices, pen input, etc.) to the NLP financial aggregator system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 can represent a single CPU, multiple CPUs, a single CPU having multiple processing cores, and the like. Additionally, the memory 708 represents random access memory. Furthermore, the storage 710 may be a disk drive. Although shown as a single unit, the storage 710 may be a combination of fixed or removable storage devices, such as fixed disc drives, removable memory cards or optical storage, network attached storage (NAS), or a storage area-network (SAN).

As shown, storage 710 includes the NLP financial aggregator 112 and memory 708 includes the request classifier 204. The NLP financial aggregator 112 receives a request for financial information via the network 102. The NLP financial aggregator 112 extracts keywords from the request and provides the keywords to the request classifier 204 as input features. Based on the keywords, the request classifier 204 determines a request type. Based on the request type, the NLP financial aggregator 112 creates a database query for the requested financial information. The NLP financial aggregator 112 may also determine a time period or categories for the request based on the keywords and include indicia of the time period and the categories in the query.

The NLP financial aggregator 112 submits the query to a database and receives the financial information in response. The NLP financial aggregator 112 generates a natural-language response based on the request type and sends the response via the network 102. The natural language response includes the financial information.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for generating a database query corresponding to a natural-language request, the method comprising:
   receiving a natural-language request for financial information;
   determining a set of natural language processing (NLP) features characterizing the natural-language request;
   generating a database query to retrieve the requested financial information based on the set of NLP features by:
      generating an initial stub of the database query;
      determining scores for a plurality of request types based on mappings between keywords in the set of NLP features and numerical amounts for the plurality of request types;
      choosing a request type of the plurality of request types based on the scores, wherein the request type is associated with a query segment template and a query response template;
      appending a first query segment to the initial stub of the database query based on the query segment template;
      determining, based on the set of NLP features, a category to be applied as a filter; and
      appending a word and an indicator of the category to the database query, after the first query segment, to apply the filter;
   submitting the database query to a database; and
   responding to the natural-language request based on inserting a query response from the database into the query response template associated with the request type to create a natural language response.

2. The computer-implemented method of claim 1, further comprising:
   appending additional syntax to the database query to apply filtering criteria based on the set of NLP features.

3. The computer-implemented method of claim 1, further comprising:
   determining, based on the set of NLP features, a time period indicated by the natural-language request; and
   indicating the time period in the database query.

4. A non-transitory computer-readable storage medium containing instructions that, when executed by one or more processors, perform an operation for generating a database query based on a natural-language request, the operation comprising:
   receiving a natural-language request for financial information;

determining a set of natural language processing (NLP) features characterizing the natural-language request;
generating a database query to retrieve the requested financial information based on the set of NLP features by:
generating an initial stub of the database query;
determining scores for a plurality of request types based on mappings between keywords in the set of NLP features and numerical amounts for the plurality of request types;
choosing a request type of the plurality of request types based on the scores, wherein the request type is associated with a query segment template and a query response template;
appending a first query segment to the initial stub of the database query based on the query segment template;
determining, based on the set of NLP features, a category to be applied as a filter; and
appending a word and an indicator of the category to the database query, after the first query segment, to apply the filter;
submitting the database query to a database; and
responding to the natural-language request based on inserting a query response from the database into the query response template associated with the request type to create a natural language response.

5. The non-transitory computer-readable storage medium of claim 4, wherein the operation further comprises:
appending additional syntax to the database query to apply filtering criteria based on the set of NLP features.

6. The non-transitory computer-readable storage medium of claim 4, wherein the operation further comprises:
determining, based on the set of NLP features, a time period indicated by the natural-language request; and
indicating the time period in the database query.

7. A system comprising:
one or more processors; and
memory storing one or more applications that, when executed on the one or more processors, perform an operation for generating a database query based on a natural-language request, the operation comprising:
receiving a natural-language request for financial information,
determining a set of natural language processing (NLP) features characterizing the natural-language request,
generating a database query to retrieve the requested financial information based on the set of NLP features by:
generating an initial stub of the database query;
determining scores for a plurality of request types based on mappings between keywords in the set of NLP features and numerical amounts for the plurality of request types;
choosing a request type of the plurality of request types based on the scores, wherein the request type is associated with a query segment template and a query response template;
appending a first query segment to the initial stub of the database query based on the query segment template;
determining, based on the set of NLP features, a category to be applied as a filter; and
appending a word and an indicator of the category to the database query, after the first query segment, to apply the filter;
submitting the database query to a database; and
responding to the natural-language request based on inserting a query response from the database into the query response template associated with the request type to create a natural language response.

8. The system of claim 7, wherein the operation further comprises:
appending additional syntax to the database query to apply filtering criteria based on the set of NLP features.

9. The system of claim 7, wherein the operation further comprises:
determining, based on the set of NLP features, a time period indicated by the natural-language request; and
indicating the time period in the database query.

* * * * *